United States Patent
Koschany et al.

(10) Patent No.: US 11,777,107 B2
(45) Date of Patent: Oct. 3, 2023

(54) GAS-SOLID REDUCTION PROCESS FOR PREPARATION OF PLATINUM-CONTAINING CATALYSTS FOR FUEL CELLS

(71) Applicant: HYZON MOTORS INC., Honeoye Falls, NY (US)

(72) Inventors: Arthur E. Koschany, Shanghai P.R. (CN); Rajesh Bashyam, Delta (CA); Zhai Jun, Shanghai (CN)

(73) Assignee: HYZON MOTORS INC., Honeoye Falls, NY (US)

( * ) Notice: Subject to any disclaimer, the term of this patent is extended or adjusted under 35 U.S.C. 154(b) by 240 days.

(21) Appl. No.: 17/486,989

(22) Filed: Sep. 28, 2021

(65) Prior Publication Data

US 2022/0102736 A1    Mar. 31, 2022

Related U.S. Application Data

(60) Provisional application No. 63/084,167, filed on Sep. 28, 2020.

(51) Int. Cl.
*H01M 8/04* (2016.01)
*H01M 4/92* (2006.01)
*B22F 9/22* (2006.01)

(52) U.S. Cl.
CPC ............. *H01M 4/926* (2013.01); *B22F 9/22* (2013.01); *B22F 2301/25* (2013.01)

(58) Field of Classification Search
CPC ...................................................... H01M 8/04
See application file for complete search history.

(56) References Cited

U.S. PATENT DOCUMENTS

| 5,489,563 | A | 2/1996 | Brand et al. |
| 5,512,529 | A | 4/1996 | Deller et al. |
| 6,007,934 | A | 12/1999 | Auer et al. |
| 7,208,437 | B2 | 4/2007 | Renock et al. |
| 2004/0248731 | A1 | 12/2004 | Vogel et al. |
| 2007/0207565 | A1 | 9/2007 | Kodas et al. |
| 2009/0227445 | A1 | 9/2009 | Lee et al. |
| 2010/0092830 | A1 | 4/2010 | Hayashi et al. |

FOREIGN PATENT DOCUMENTS

| CN | 113097508 | * 7/2021 |
| JP | 2006269096 A | 10/2006 |
| WO | 2020167257 A1 | 8/2020 |

OTHER PUBLICATIONS

Written Opinion of the International Searching Authority dated Jan. 19, 2022.

* cited by examiner

*Primary Examiner* — Jacob B Marks
(74) *Attorney, Agent, or Firm* — Jacob M. Ward; Ward Law Office LLC

(57) ABSTRACT

A method for manufacturing a catalyst for a fuel cell can include provision of a platinum precursor and a carbon material. The platinum precursor and the carbon material can be mixed to form a platinum carbon mixture. The platinum carbon mixture can be heated to form a porous solid. The porous solid can be milled to form a powder. The powder can be reacted with a reducing agent to form the catalyst.

20 Claims, 1 Drawing Sheet

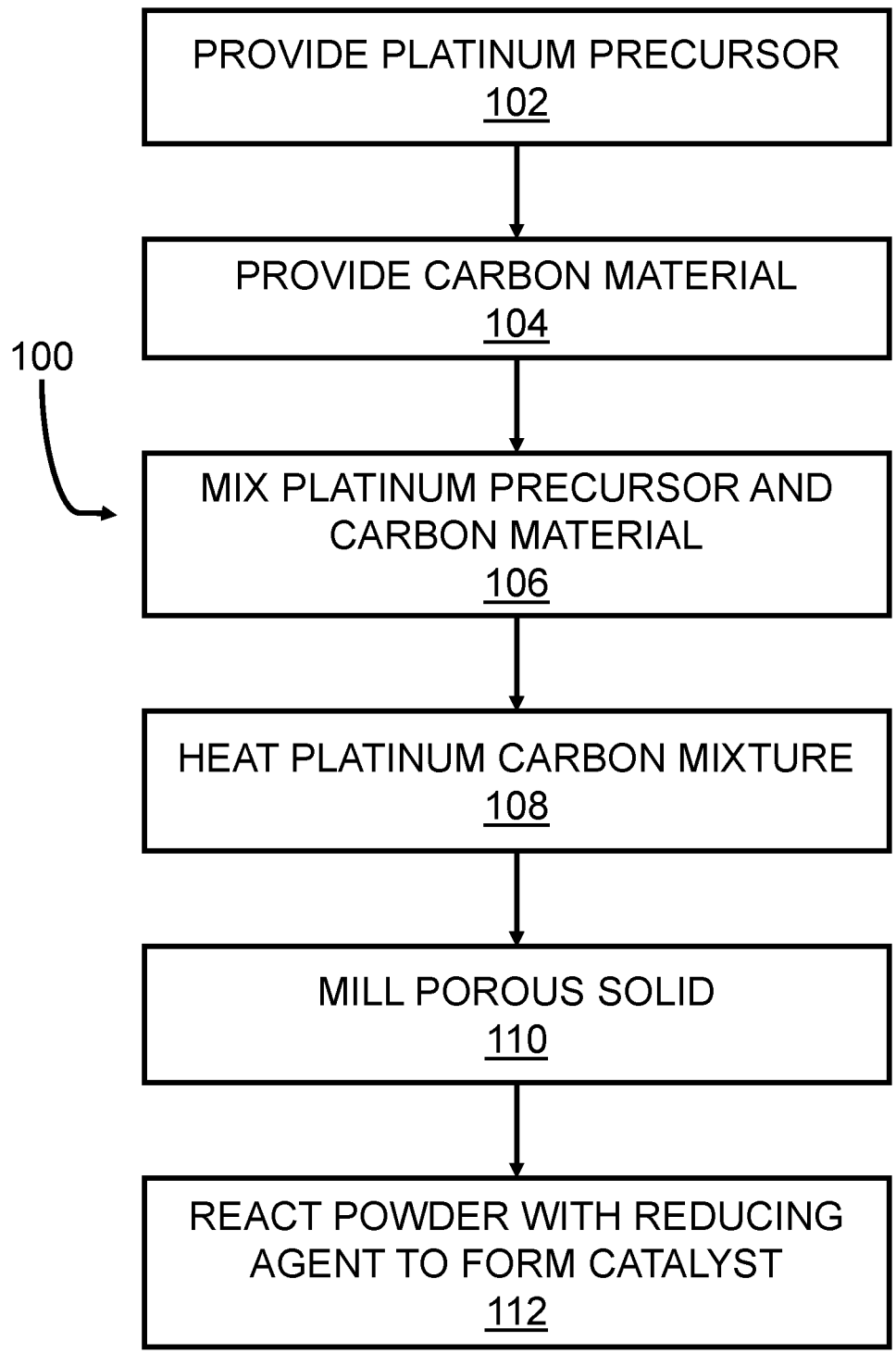

GAS-SOLID REDUCTION PROCESS FOR PREPARATION OF PLATINUM-CONTAINING CATALYSTS FOR FUEL CELLS

CROSS-REFERENCE TO RELATED APPLICATIONS

This application claims the benefit of U.S. Provisional Application No. 63/084,167, filed on Sep. 28, 2020. The entire disclosure of the above application is hereby incorporated herein by reference.

FIELD

The present technology relates to fuel cell catalysts, and more particularly, to a method of manufacturing fuel cell catalysts.

INTRODUCTION

This section provides background information related to the present disclosure which is not necessarily prior art.

Fuel cell systems are currently being developed for use as power supplies in numerous applications, such as vehicles and stationary power plants. Such systems offer promise of delivering power economically and with environmental and other benefits. To be commercially viable, however, fuel cell systems should exhibit adequate reliability in operation, even when the fuel cells are subjected to conditions outside their preferred operating ranges.

Fuel cells convert reactants, namely, fuel and oxidant, to generate electric power and reaction products. Polymer electrolyte membrane fuel cells (PEM fuel cells) employ a membrane electrode assembly (MEA), which includes a polymer electrolyte or ion-exchange membrane disposed between two electrodes, namely a cathode and an anode. A catalyst typically induces the desired electrochemical reactions at the electrodes. Separator plates or bipolar plates, including plates providing a flow field for directing the reactants across a surface of each electrode substrate, are disposed on each side of the MEA.

In operation, the output voltage of an individual fuel cell under load can be below one volt. Therefore, in order to provide greater output voltage, multiple cells can be stacked together and are connected in series to create a higher voltage fuel cell stack. End plate assemblies can be placed at each end of the stack to hold the stack together and to compress the stack components together. Compressive force can provide sealing and adequate electrical contact between various stack components. Fuel cell stacks can then be further connected in series and/or parallel combinations to form larger arrays for delivering higher voltages and/or currents.

A platinum containing catalyst for fuel cells can be manufactured by a process that includes reducing a platinum salt, for example, hexachloroplatinic acid hexahydrate ($H_2PtCl_6 \cdot 6H_2O$), in a slurry of carbon black, water, and an organic reducing agent like glycol. A disadvantage to preparing a platinum catalyst using this process relates to sluggish temperature control, and thus, particle size control. This process can further require extensive washing after reduction in order to remove remaining organic reducing agents and other decomposition products.

Accordingly, there is a continuing need for a method of manufacturing a catalyst for a fuel cell, which allows for improved particle size control.

SUMMARY

In concordance with the instant disclosure, ways of manufacturing a catalyst for a fuel cell, which allow for improved particle size control, have surprisingly been discovered.

In one embodiment, a method for manufacturing a catalyst for a fuel cell can include provision of a platinum precursor and a carbon material. The platinum precursor and the carbon material can be mixed to form a platinum carbon mixture. The platinum carbon mixture can be heated to form a porous solid. The porous solid can be milled to form a powder. The powder can be reduced to form the catalyst.

According to the present technology, in certain embodiments, a platinum containing catalyst can be produced according to the methods described herein. Carbon black and hexachloroplatinic acid hexahydrate ($H_2PtCl_6 \cdot 6H_2O$) can be extensively mixed at a temperature of about 60° C. to about 80° C. At this temperature range, the platinum salt can melt due to a high crystal water content. The mixing process can be performed using one or more conventional laboratory techniques for mixing.

Next, a temperature of the carbon black and hexachloroplatinic acid hexahydrate mixture can be increased; e.g., to about 110° C. Heating to this temperature can help remove any crystal water from the mixture. It should be appreciated that some of the $H_2PtCl_6$ can form $PtCl_4$ at this temperature.

After the crystal water is removed, the mixture can have the form of a porous solid, which can then be milled to a powder having a desired particle size; e.g., a dust-like powder. This powder can be placed in a reactor, which can be purged with various gases and eventually placed under vacuum. Initially, the reactor can contain an inert gas (e.g., Ar) or the powder can be placed under vacuum, whereupon the powder can then be heated; e.g., to about 140-180° C. Then, small portions of $H_2$ can be added to the inert gas flow. $H_2PtCl_6$ can thereby react, being reduced by the hydrogen, to form Pt and HCl. Gaseous HCl can be removed with by a continuous flow or purge of the inert gas. A total reaction time can be less than a few minutes. It is possible to control the Pt particle size by tailoring the reduction reaction temperature and $H_2$ concentration.

After being cooled, the powder including Pt can be used as a catalyst. Advantageously, the powder can be immediately used and does not require further washing. It should be appreciated that $H_2$ can be replaced by methanol or other organic reducing agents as long as there is no residue of the reducing agent in the decomposition products at the given reaction conditions.

In certain embodiments, the initial mixing process can be performed with carbon black, platinum salt, and ionomer solution. During the elevated temperature treatment (e.g., at 110° C.), the solvents of the ionomer solution can evaporate, and a solid powder can be obtained. All other process steps can be as described above. The advantage of including ionomer is a larger kind of four phase zone of Pt/carbon/ionomer/voids can result. Likewise, in certain cases the ionomer solution can also include an alcohol, which can aid in Pt reduction.

For binary catalysts, e.g., PtCo alloy or core-shell types, a gas-solid reduction step can be performed using a cobalt salt and somewhat more vigorous reaction conditions; e.g., increased time and/or temperature. The resultant platinum salt can then be reduced as described hereinabove. Using a single step method with mixed platinum and cobalt salts can work as well.

In certain embodiments, an organometallic Pt precursor can be used. Such organometallic precursors (e.g., organometallic Pt+C+ionomer) can be decomposed at relatively low temperatures (e.g., between 50° C. and 100° C.) and decomposed organic products can be volatilized and removed in gas form.

Though the manufacturing process is described herein as a batch process, it should be appreciated that a continuous manufacturing process can also be employed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a flow chart depicting a method for manufacturing a catalyst for a fuel cell, according to one embodiment of the present disclosure.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

The present disclosure relates to methods of manufacturing a catalyst for a fuel cell. It should be appreciated that the methods of the present disclosure are particularly suitable for scalable manufacture of catalysts. In other words, the methods can be utilized in both a batch type process and a large-scale manufacturing process. In particular, the methods can produce a final catalyst product that is substantially free of residual reagents without a washing step. Additionally, the methods of the present disclosure are well suited to allow for particle size control, which can ultimately lead to more efficiency of the final catalyst product.

In certain embodiments, the present disclosure includes a method 100 for manufacturing a catalyst for a fuel cell, for example, as shown in FIG. 1. The method 100 can include a step 102 of providing a platinum precursor. The platinum precursor can be a solid powder material. The platinum precursor can include at least 25 wt. % platinum, and in certain embodiments, can include at least 35 wt. % platinum. In one particular embodiment, the platinum precursor can be hexachloroplatinic acid hexahydrate ($H_2PtCl_6 \cdot 6H_2O$). A skilled artisan can select another suitable platinum precursor, as desired.

The method 100 can include a step 104 of providing a carbon material. In particular, the carbon material can be a carbon powder. The carbon powder can be a microporous carbon powder. In one particular embodiment, the carbon material can include carbon black. A skilled artisan can select other suitable carbon materials, as desired.

The method 100 can include a step 106 of mixing the platinum precursor and the carbon material to form a mixture. The mixing can be performed for a predetermined time sufficient to provide a substantially even distribution of the platinum precursor with the carbon material, for example. Importantly, the carbon material and the platinum precursor can be mixed without the use of additives or solvents. The third step 106 can be performed in the presence of heat. The mixing step can be performed at a first temperature, at which the platinum precursor melts. For example, the first temperature can be from about 50° C. to about 90° C., and more particularly, about 60° C. to about 80° C. The mixing step 106 can be performed with a high-speed mixing device, an ultrasonic mixing device, or a high-pressure homogenizing device.

It should be appreciated that the since the mixing step 106 can be performed without the use of additional solvents or additives, the method 100 can be more manufacturable and scalable than certain other methods of producing platinum catalysts. In particular, the method 100 can be performed without a washing step to remove remnants or reactants formed by additional solvents. By removing the washing step, the method 100 can be performed in a large-scale production operation due to the use of less reactants and the formation of fewer undesirable byproducts.

The method 100 can include a step 108 of heating the mixture including the platinum and carbon, as formed in step 106. The heating may be performed for a predetermined time sufficient result in a substantially even temperature distribution of the mixture, for example. In particular, the platinum and carbon mixture can be heated to a second temperature. The second temperature can be selected to allow for removal of any water of crystallization that can be present in the platinum and carbon mixture from the platinum precursor. For example, the second temperature can be greater than about 100° C., and more particularly about 110° C. Step 108 can result in the formation of a porous solid.

The method 100 can include a step 110 of milling the porous solid to form a powder. One of ordinary skill in the art may select a predetermined particle size mean and distribution to which to mill the porous solid to the powder, as desired. Techniques for milling the porous solid can include manual or machine disruption methods, such as sieving, grinding, milling, or combinations thereof. Such methods are well-known to those of skill in the art. Various types of mills can be employed in this context such as roller, bead, and ball mills and rotary crushers and similar particle creation equipment known in the art. In a specific example, a roller mill can be employed. A roller mill can have multiple stages to gradually reduce the size of the porous solid. The porous solid can be milled via passage through a sieve of known mesh size. In another example, a rotary crusher can be employed. A skilled artisan can select other suitable milling methods, as desired.

Advantageously, the mixing step 106 and the milling step 110 can work synergistically to provide an improved final catalyst product. As described hereinabove, the mixing step 106 can be performed in the absence of solvent. It is therefore not necessary to use any additional solvent when mixing the platinum precursor and the carbon material to form the mixture. Accordingly, during the milling step 110, the porous solid being milled can be substantially free of additional solvents or reagents. It should be appreciated that the lack of solvent allows the method 100 to be performed without a washing step, as described hereinabove. Accordingly, the resultant milled power of the milling step 110 can be a substantially homogenous blend of the carbon material and the platinum precursor. Since the powder can be substantially free of other reactants, the powder can allow the platinum precursor to enter substantially all of the pores of the carbon material, whereas certain other methods can allow the additional solvent or reagents to permeate the pores of the carbon material, which can lead to subsequent gaps in the carbon pores when the washing step of certain known methods is performed. It should be appreciated that this can allow the final catalyst product to have a greater loading of platinum on carbon, compared to catalysts prepared to known methods. In some embodiments, the final catalyst product can have a final platinum loading of about 50 wt. %.

The method 100 can have a step 112 of reacting the powder formed by the milling step 110 with a reducing agent, thereby forming the catalyst, the catalyst including platinum particles disposed on carbon particles. In one particular embodiment, the reacting step 112 can be performed using hydrogen gas as the reducing agent. In certain example embodiments, the hydrogen gas can include other gases (e.g., nitrogen). Alternatively, the hydrogen can be include or be replaced with other reducing agents, such as methanol or other organic substances that are capable of reducing the powder without leaving residual reaction products within the final catalyst product.

During the reacting step 112, the powder can be placed in a reactor. One of ordinary skill may react the powder in the reactor for a predetermined amount of time sufficient to fully reduce the powder, as desired. The reactor can have an inert gas flow, such as argon. In other embodiments, the reactor can be under vacuum conditions. The reactor can be heated. For example, the reactor can be heated to about 140° C. to about 180° C. Hydrogen gas can be pumped into the reactor through the inert gas flow. The hydrogen can react with the powder to form the final catalyst product and hydrochloric gas. The hydrochloric gas can be released from the reactor through the inert gas flow. It should be appreciated that a particle size of the platinum can be controlled during the reacting step 112 by controlling a temperature of the reactor and a concentration of hydrogen within the reactor. Advantageously, after cooling, the final catalyst product can be immediately used as a catalyst, for example, within a fuel cell.

In certain embodiments, the reacting step 112 can be performed with a gradual increase in the pressure of hydrogen within the reactor. One skilled in the art may select a suitable predetermined rate of pressure increase for the hydrogen within the reactor, as desired. For example, an initial pressure of hydrogen can be about 1 kPa partial pressure. The flow of hydrogen can then be gradually increased to a partial pressure of hydrogen of about 150 kPa. Advantageously, the gradual increase in hydrogen pressure during the reduction step can allow for a more thorough reduction of the platinum, and can allow for a greater platinum loading in the final catalyst product.

In another embodiment of the present disclosure, the method 100 can be performed in a multi-stage process. For example, the method 100 can include repeating the mixing step 106, the heating step 108, and the reacting step 112 to provide the catalyst with additional platinum particles disposed on the carbon particles. Certain embodiments can include a first platinum loading stage and a second platinum loading stage. The first platinum loading stage can include the method 100, as described hereinabove, with a platinum loading of about 10 wt. % on the carbon particles. The resultant catalyst product from the first platinum loading stage can then be mixed with additional platinum precursor (repeating the mixing step 106, the heating step 108, and the reacting step 112) to where the carbon particles have about 50 wt. % loading of platinum. This mixture can then be reduced with hydrogen as described hereinabove. The final catalyst product produced according to the two-stage manufacturing process can result in a greater overall performance of the catalyst product. While bound to no particular theory, it is believed that the two-stage manufacturing process results in smaller sized platinum particles, but a greater number of platinum particles disposed on the carbon particles.

In certain embodiments, the mixing step 106 can be performed with carbon black, platinum salt, and an ionomer solution. During the heating step 108 (e.g., at 110° C.), the solvents of the ionomer solution can evaporate, and a solid powder can be obtained. All other process steps can be as described above. The advantage of including ionomer is that a four phase zone of platinum/carbon/ionomer/voids can result. Likewise, in certain cases the ionomer solution can also include an alcohol, which can aid in platinum reduction.

For binary catalysts, e.g., PtCo alloy or core-shell types, a gas-solid reduction step can be performed using a cobalt salt and somewhat more vigorous reaction conditions, e.g., increased time and/or temperature. The resultant platinum salt can then be reduced as described hereinabove. Using a single step method with mixed platinum and cobalt salts can work as well.

In certain embodiments, an organometallic platinum precursor can be used. Such organometallic precursors (e.g., organometallic platinum, carbon, and ionomer) can be decomposed at relatively low temperatures (e.g., between 50° C. and 100° C.) and decomposed organic products can be volatilized and removed in gas form.

Though the manufacturing process is described herein as a batch process, it should be appreciated that a continuous process can also be employed. It should be appreciated that the method 100 of the present disclosure is particularly adapted to be scalable based on manufacturing needs. In other words, the method 100 can be performed in a small batch process or in a large-scale manufacturing process without major adjustment to the method 100 steps.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:

1. A method for manufacturing a catalyst for a fuel cell, comprising:
    mixing a platinum precursor and a carbon material to form a mixture;
    heating the mixture to form a porous solid;
    milling the porous solid to form a powder; and
    reacting the powder with a reducing agent, thereby forming the catalyst, the catalyst including platinum particles disposed on carbon particles.

2. The method of claim 1, wherein the platinum precursor is hexachloroplatinic acid hexahydrate.

3. The method of claim 1, wherein the carbon material is carbon black.

4. The method of claim 1, wherein the mixing step is performed at a temperature from about 60° C. to about 80° C.

5. The method of claim 1, wherein the mixing step is performed in absence of a solvent.

6. The method of claim 1, wherein the heating step includes heating the mixture of the platinum precursor and the carbon material to about 110° C.

7. The method of claim 1, wherein the reducing agent includes hydrogen gas.

8. The method of claim 7, wherein the reacting step includes placing the powder into a reactor having an inert gas flow.

9. The method of claim 8, wherein the reactor is heated to a temperature from about 140° C. to about 180° C.

10. The method of claim 8, wherein the hydrogen gas is added to the inert gas flow to form the catalyst and hydrochloric gas.

11. The method of claim 10, wherein the reacting step includes increasing a pressure of hydrogen within the reactor over a predetermined period of time.

12. The method of claim 11, wherein increasing the pressure of hydrogen includes increasing the pressure of hydrogen from about 1 kPa partial pressure to about 150 kPa partial pressure.

13. The method of claim 10, wherein the inert gas flow includes nitrogen.

14. The method of claim 1, further comprising repeating the mixing step, the heating step, and the reacting step to provide the catalyst with additional platinum particles disposed on the carbon particles.

15. The method of claim 1, wherein the catalyst has a platinum loading of about 50 wt. %.

16. The method of claim 1, wherein the mixing step includes mixing the platinum precursor and the carbon material with an ionomer.

17. The method of claim 1, wherein the platinum precursor is hexachloroplatinic acid hexahydrate, the carbon material is carbon black, the mixing step is performed at a temperature from about 60° C. to about 80° C. in absence of a solvent, the heating step includes heating the mixture of the platinum precursor and the carbon material to about 110° C., and the reducing agent in the reacting step includes hydrogen gas.

18. The method of claim 17, wherein the reacting step includes placing the powder into a reactor having an inert gas flow, the reactor is heated to a temperature from about 140° C. to about 180° C., and the hydrogen gas is added to the inert gas flow to form the catalyst and hydrochloric gas.

19. A catalyst manufactured according to the method of claim 1.

20. A fuel cell comprising a membrane electrode assembly having a catalyst manufactured according to claim 1.

* * * * *

UNITED STATES PATENT AND TRADEMARK OFFICE
CERTIFICATE OF CORRECTION

| | |
|---|---|
| PATENT NO. | : 11,777,107 B2 |
| APPLICATION NO. | : 17/486989 |
| DATED | : October 3, 2023 |
| INVENTOR(S) | : Arthur E. Koschany, Rajesh Bashyam and Zhai Jun |

Page 1 of 1

It is certified that error appears in the above-identified patent and that said Letters Patent is hereby corrected as shown below:

On the Title Page

Item (72) Inventors, Please update the listing to read as follows:
Arthur E. Koschany    Shanghai P.R. (DE)
Rajesh Bashyam    Delta (CA)
Jun Zhai    Shanghai (CN)

Signed and Sealed this
Twenty-ninth Day of April, 2025

Coke Morgan Stewart
*Acting Director of the United States Patent and Trademark Office*